(12) United States Patent
Lee

(10) Patent No.: US 7,422,436 B2
(45) Date of Patent: Sep. 9, 2008

(54) SLIDE MODULE HAVING DUAL MOVEMENT AND MOBILE TERMINAL HAVING THE SAME

(75) Inventor: Eun-Sub Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 34 days.

(21) Appl. No.: 11/549,093

(22) Filed: Oct. 12, 2006

(65) Prior Publication Data
US 2007/0082545 A1    Apr. 12, 2007

(30) Foreign Application Priority Data
Oct. 12, 2005    (KR)    ...................... 10-2005-0096223

(51) Int. Cl.
*H01R 39/00*    (2006.01)
(52) U.S. Cl. ....................................... 439/10
(58) Field of Classification Search ................... 439/10, 439/372; 455/575.4, 575.1, 550.1; 361/490, 361/686; 345/164; 16/334
See application file for complete search history.

(56) References Cited

U.S. PATENT DOCUMENTS

| | | | |
|---|---|---|---|
| 7,252,511 B2 * | 8/2007 | Santos et al. | 439/10 |
| 7,303,424 B2 * | 12/2007 | Tu et al. | 439/372 |
| 2005/0059438 A1 | 3/2005 | Jellicoe | |
| 2005/0064919 A1 * | 3/2005 | An et al. | 455/575.3 |
| 2005/0104856 A1 | 5/2005 | Jacobs | |
| 2005/0250532 A1 * | 11/2005 | Hwang et al. | 455/550.1 |
| 2005/0266897 A1 * | 12/2005 | Ahn et al. | 455/575.1 |
| 2006/0046796 A1 * | 3/2006 | Park et al. | 455/575.4 |
| 2007/0006421 A1 * | 1/2007 | Park et al. | 16/334 |
| 2007/0049356 A1 * | 3/2007 | Jung et al. | 455/575.1 |
| 2007/0249394 A1 * | 10/2007 | Bong Doo | 455/556.1 |

FOREIGN PATENT DOCUMENTS

| | | |
|---|---|---|
| EP | 1 515 525 A2 | 3/2005 |
| EP | 1 631 043 A1 | 3/2006 |
| KR | 10-2005-0105895 A | 11/2005 |

* cited by examiner

*Primary Examiner*—Chandrika Prasad
(74) *Attorney, Agent, or Firm*—Lee, Hong, Degerman, Kang & Schmadeka

(57) ABSTRACT

A slide module having a first slide member moving in a lengthwise direction, a second slide member moving in a widthwise direction, and a guide member disposed between the first and second slide members, guiding movement of the first slide member in the lengthwise direction and guiding movement of the second slide member in the widthwise direction. Accordingly, when the slide module is moved in the lengthwise direction, its movement in the widthwise direction is limited, while when the slide module is moved in the widthwise direction, its movement in the lengthwise direction is limited. A mobile terminal having the slide module is capable opening in the lengthwise direction and the widthwise direction.

36 Claims, 8 Drawing Sheets

SLIDE MODULE HAVING DUAL MOVEMENT AND MOBILE TERMINAL HAVING THE SAME

CROSS-REFERENCE TO RELATED APPLICATION

Pursuant to 35 U.S.C. § 119(a), this application claims the benefit of earlier filing date and right of priority to Korean Application No. 96223/2005, filed on Oct. 12, 2005, the contents of which are hereby incorporated by reference herein in their entirety.

FIELD OF THE INVENTION

The present invention relates to a mobile terminal having a slide module and, more particularly, to a slide module capable of opening the mobile terminal in a lengthwise direction and in a widthwise direction.

DESCRIPTION OF THE RELATED ART

In general, mobile terminals are divided into a flip type mobile terminal having a flip rotatably mounted at a main body such that an input button region can be opened and closed, and a folder type mobile terminal including a main body having dial buttons and menu buttons and a folder rotatably mounted on the main body and having an LCD attached thereon. Recently, in order to meet the various consumers' demands, slide type mobile terminals having a slide module in which a cover having dial buttons and menu buttons are slidably opened and closed on a main body on which the LCD is attached, are increasingly used.

FIG. 1 is a front view of a slide module in accordance with a related art. The related art slide module includes a first slide member 110 fixed at a first body (not shown) and a second slide member 120 fixed at the second body (not shown) and slidably mounted on the first slide member 110.

A first slide rail 112 is formed in a lengthwise direction at both edges of the first slide 110, and a second slide rail 122 is formed at the second slide member 120 such that it is inserted in the first slide rail 112 and moved along the first slide rail 112.

As for the slide module, when the first body is moved in the lengthwise direction, the first slide member 110 connected with the first body is slidably moved in the relatively lengthwise direction of the second slide member 120.

However, since the related art slide module is slidably moved only in the lengthwise direction, it cannot satisfy various usage conditions.

Therefore, there is a need for a slide module for effectively providing movement in a lengthwise direction and a widthwise direction and that is adaptable to a mobile terminal. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to a mobile terminal having a slide module capable of opening the mobile terminal in a lengthwise direction and in a widthwise direction.

Therefore, one object of the present invention is to provide a slide module which can provide movement in both in a lengthwise direction and in a widthwise direction, and a mobile terminal having the slide module.

Another object of the present invention is to provide a slide module which can be easily used such that when the slide module is moved in a lengthwise direction, its movement in a widthwise direction is limited, while when the slide module is moved in the widthwise direction, its movement in the lengthwise direction is limited.

To achieve at least the above objects, there is provided a slide module comprising a first slide member moving in a lengthwise direction, a second slide member moving in a widthwise direction, and a guide member disposed between the first and second slide members, guiding movement of the first slide member in the lengthwise direction and guiding movement of the second slide member in the widthwise direction.

The guide member includes a first guide portion for guiding the first slide member to be moved in the lengthwise direction and a second guide portion for guiding the second slide member to be movable in the widthwise direction.

The first slide member includes a first slide rail and a second slide rail in which the first guide portion is inserted and moved in the lengthwise direction, and a third slide rail and a fourth slide rail in which the second guide portion is inserted and moved in the widthwise direction.

To achieve the above objects, there is also provided a mobile terminal comprising a first body having a display, a second body coupled with the first body, and a slide module installed between the first and second bodies adapted for guiding the first body to be moved in the lengthwise direction and for guiding the second body to be movable in the widthwise direction.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims. Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

The invention will be described in detail with reference to the following drawings in which like reference numerals refer to like elements wherein.

DETAILED DESCRIPTION OF THE PREFERRED EMBODIMENTS

The present invention relates to an apparatus for providing a mobile terminal with lengthwise opening movement and widthwise opening movement. Although the present invention is illustrated with respect to a mobile terminal, it is contemplated that the present invention may be utilized with other mobile communication and entertainment devices.

Reference will now be made in detail to the preferred embodiments of the present invention, examples of which are illustrated in the accompanying drawings.

The preferred embodiment of the present invention will be described with reference to the accompanying drawings.

Figure 1:
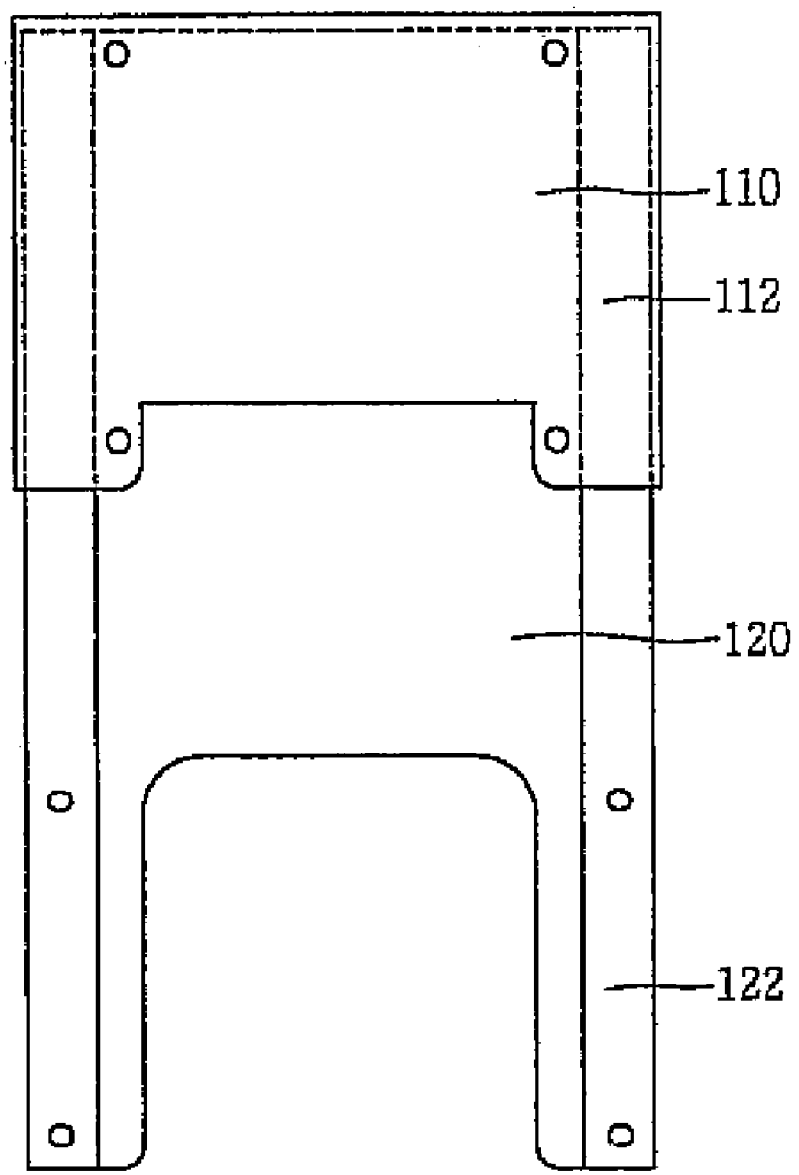
FIG. 1 is a front view of a slide module in accordance with a related art.
Figure 2:
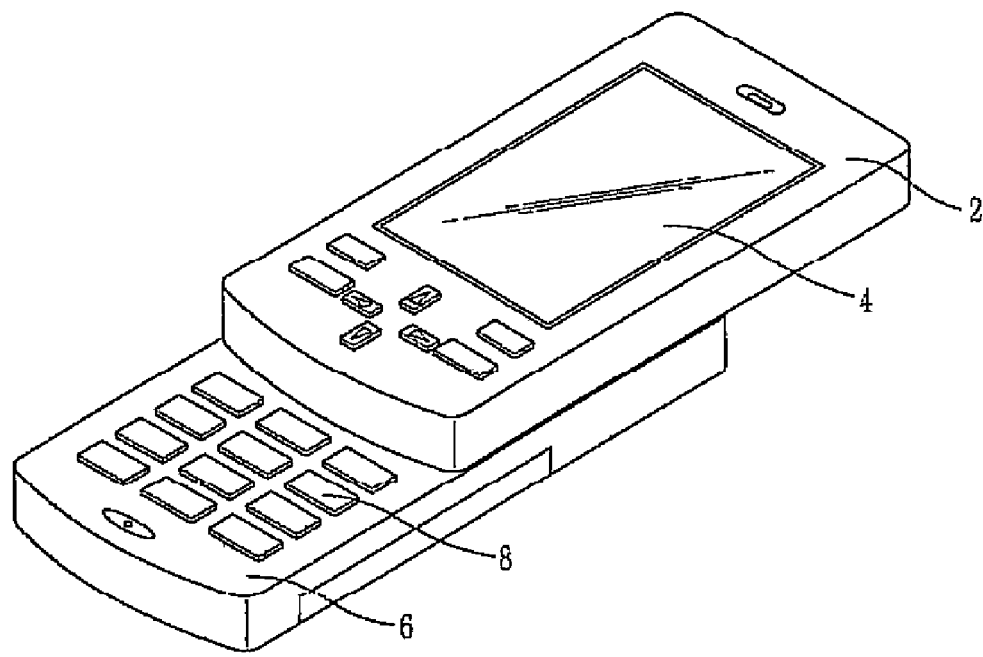
FIG. 2 is a perspective view showing an opened state of a mobile terminal in a lengthwise direction in accordance with the present invention.
Figure 3:
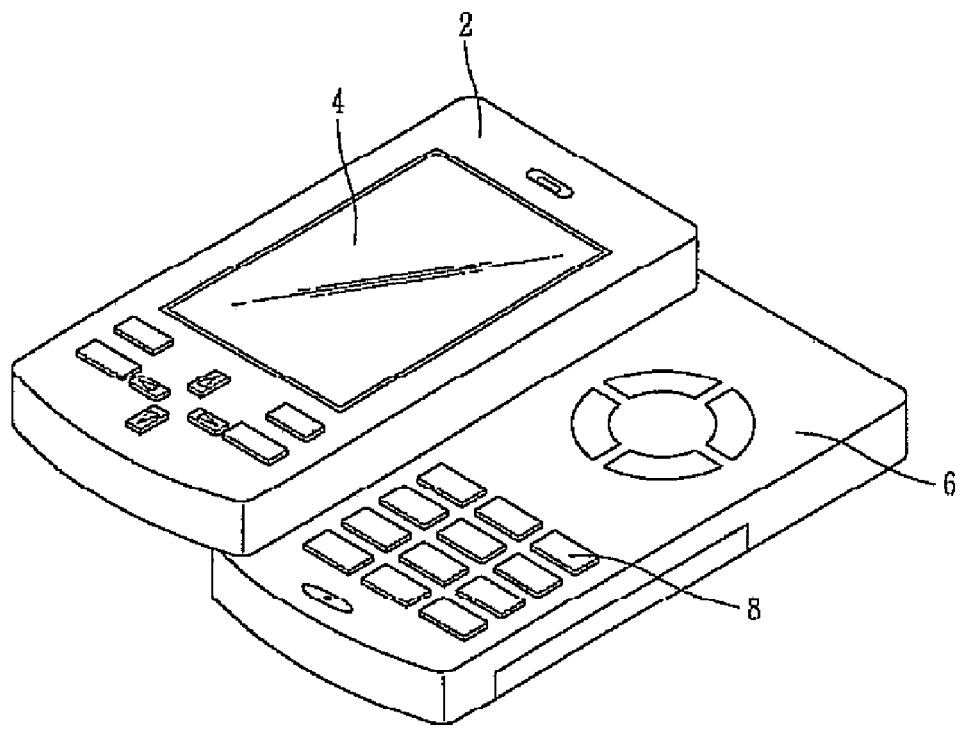
FIG. 3 is a perspective view showing an opening state of the mobile terminal in a widthwise direction in accordance with the present invention.
Figure 4:
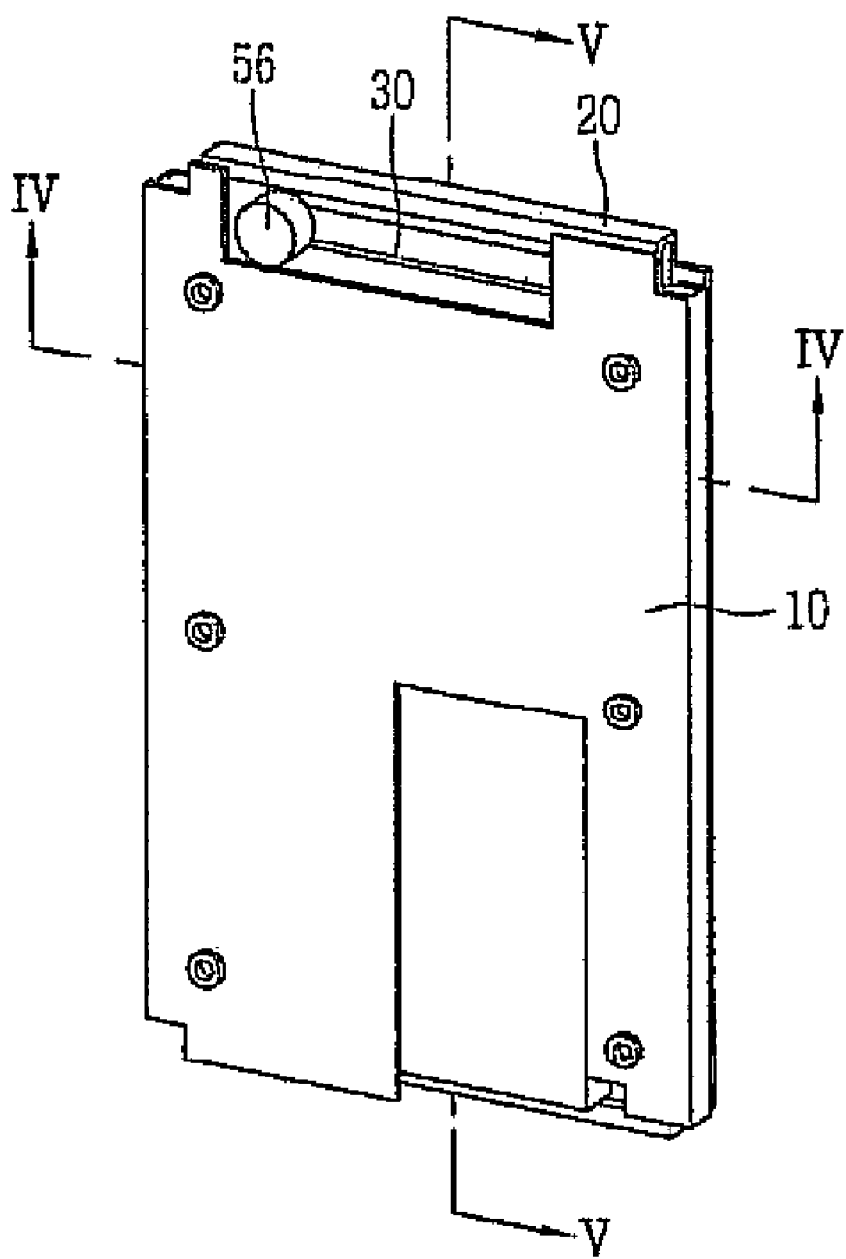
FIG. 4 is a perspective view of a slide module in accordance with the present invention.
Figure 5:
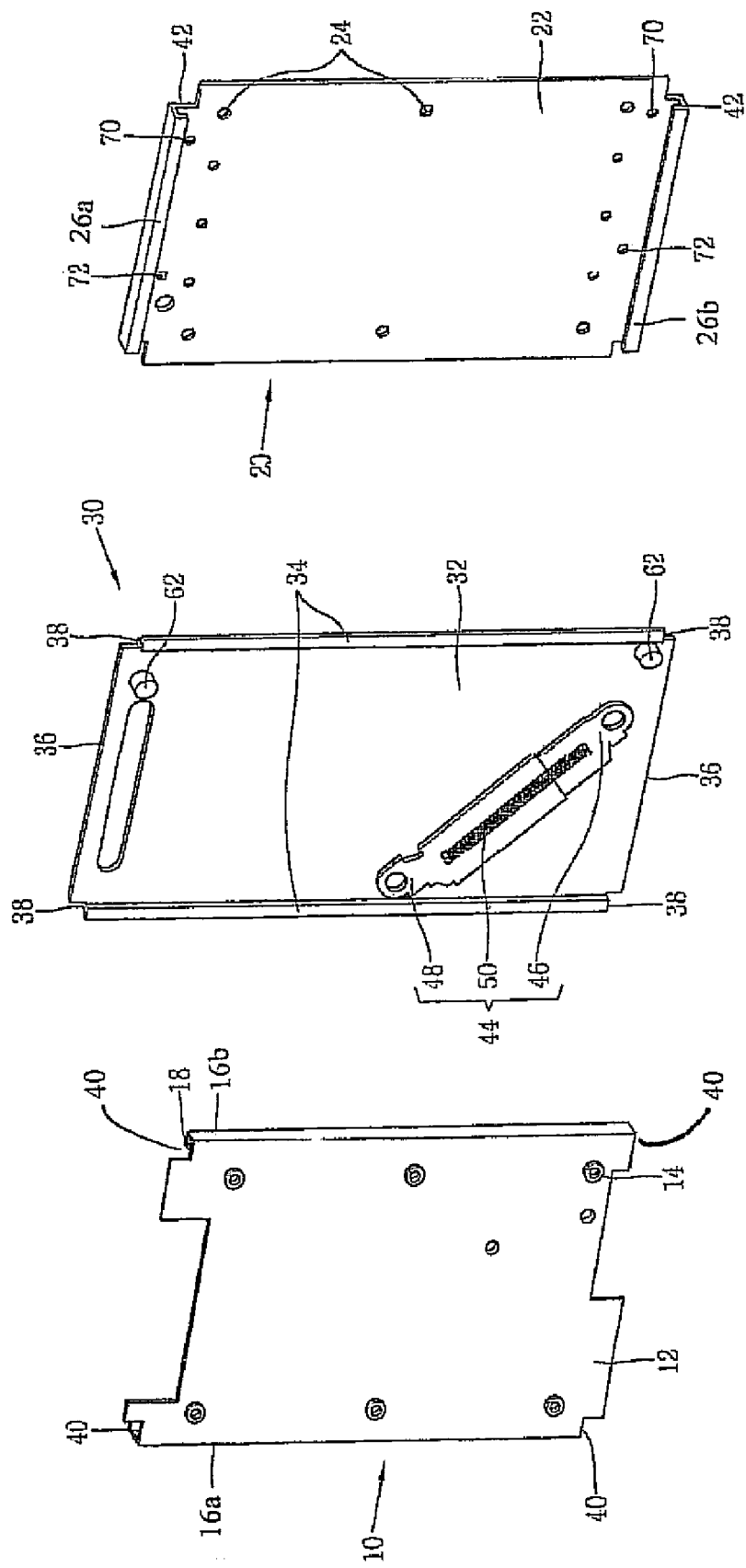
FIG. 5 is an exploded perspective view of the slide module of FIG. 4.
Figure 6:
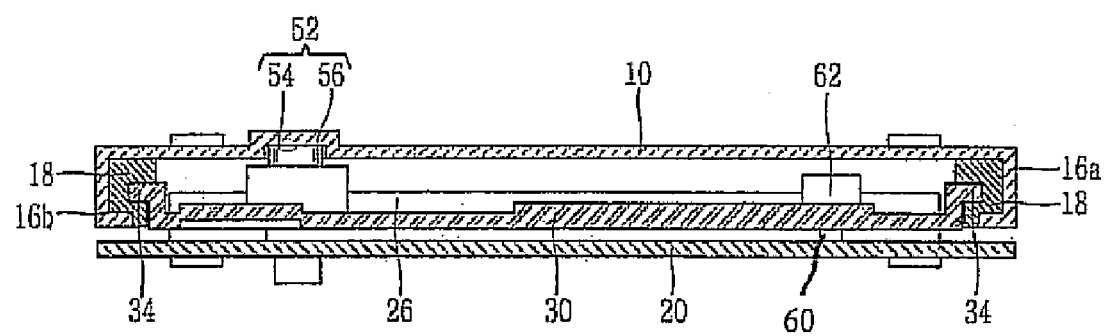
FIG. 6 is a sectional view taken along line IV-IV in FIG. 4.
Figure 7:
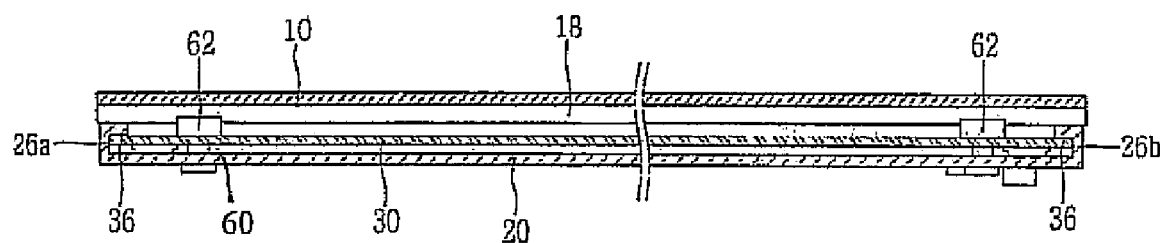
FIG. 7 is a sectional view taken along line V-V in FIG. 4.

FIG. 2 is a perspective view showing an opening state of a mobile terminal in a lengthwise direction in accordance with the present invention, FIG. 3 is a perspective view showing an opening state of the mobile terminal in a widthwise direction in accordance with the present invention, FIG. 4 is a perspective view of a slide module in accordance with the present invention, FIG. 5 is an exploded perspective view of the slide module in accordance with the present invention, FIG. 6 is a sectional view taken along line IV-IV in FIG. 4, and FIG. 7 is a sectional view taken along line V-V in FIG. 4.

The mobile terminal in accordance with the present invention includes a first body 2 having a display 4, a second body 6 coupled to be slidably moved in a widthwise direction under the first body 2 and having a keypad 8, and a slide module installed between the first body 2 and the second body 6 and guiding the first body 2 to be slidably moved in the lengthwise direction and the widthwise direction.

The slide module includes a first slide member 10 fixed at the first body 2 and slidably moved in the lengthwise direction, a second slide member 20 fixed at the second body 6 and slidably moved in the widthwise direction, and a guide member 30 disposed between the first slide member 10 and the second slide member 20, and guiding the first slide member 10 to be moved in the lengthwise direction and the second slide member 20 to be moved in the widthwise direction.

The guide member 30 includes a plate body 32, a first guide portion 34 formed at both lengthwise directional edges of the body 32 for guiding a sliding movement of the first slide member 10 in the lengthwise direction, and a second guide portion 36 formed at both widthwise directional edges of the body 32 for guiding a sliding movement of the second slide member 20 in the widthwise direction.

Herein, the first guide portion 34 is bent at a right angle upwardly as much as a certain width from both lengthwise directional edges of the body 32 and then bent again at the right angle in an outward direction.

The second guide portion 36 is formed to be parallel with the body 32 at both widthwise directional edges of the body 32.

The first slide member 10 includes a plate body 12 having a plurality of fastening holes 14 formed at a lower surface of the first body 2, preferably allowing the first slide member 10 to be fastened to the first body 2 by using a bolt, and a first slide rail 16a and a second slide rail 16b formed at the lengthwise directional edges of the plate body 12, into which the first guide portion 34 of the guide member 30 is slidably inserted.

Herein, both lengthwise directional edges of the body 12 are bent downwardly to form the first slide rail 16a and the second slide rail 16b.

A buffer member 18 is mounted at the first slide rail 16a and the second slide rail 16b to reduce contact friction and absorb an impact when the first slide member 10 is moved along the first guide portion 34, whereby the first slide member 10 can be slidably moved more smoothly.

The buffer member 18 is made of a rubber material and fixed to be insertedly coupled with the first slide rail 16a and the second slide rail 16b. The first guide portion 34 is inserted in the inner surface of the buffer member 18 in the lengthwise direction.

The second slide member 20 includes a plate body 22 having a plurality of fastening holes 24 fastened by bolts on an upper surface of the second body 6, and a third slide rail 26a and a fourth slide rail 26b formed at the widthwise directional edges of the plate body 22, into which the second guide portion 36 of the guide member 30 is slidably inserted.

The third slide rail 26a and the fourth slide rail 26b are formed by being bent two times in the upward direction at both widthwise directional edges. The second slide member 20 is slidably moved in the widthwise direction along the second guide portion 36.

Passage portions 38 are formed at four corners of the guide member 30, through which the first slide rail 16a and the second slide rail 16b pass when the first slide member 10 is moved in the lengthwise direction, and also through which the third slide rail 26a and the fourth slide rail 26b pass when the second slide member 20 is moved in the widthwise direction.

Passage portions 40 are formed at the end portions of the first slide rail 16a and the second slide rail 16b, through which the third slide rail 26a and the fourth slide rail 26b of the second slide member 20 pass when the second slide member 20 is moved in the widthwise direction.

The passage portions 40 are formed at the end portions of the first slide rail 16a and the second slide rail 16b at the side where the second slide member 20 is slidably moved along the third slide rail 26a and the fourth slide rail 26b, wherein the passage portions 40 are removed as much as the protruded width of the third slide rail 26a and the fourth slide rail 26b. The passage portion 40 prevents the third slide rail 26a and the fourth slide rail 26b from being restrained from movement by the first slide rail 16a and the second slide rail 16b when the second slide member 20 is slidably moved in the widthwise direction.

When the second slide member 20 is slidably moved in the widthwise direction, both end portions where the passage portion 40 of the first slide rail 16a and the second slide rail 16b are formed are restrained from movement at the inner sides of the third slide rail 26a and the fourth slide rail 26b. Accordingly, when the second slide member 20 is moved in the widthwise direction, since the first slide rail 16a and the second slide rail 16b are restrained from movement at the third slide rail 26a and a fourth slide rail 26b, the first slide member 10 is prevented from being moved in the lengthwise direction.

The same buffer member 18 mounted at the first slide rail 16a and the second slide rail 16b can be mounted on the third slide rail 26a and the fourth slide rail 26b to reduce friction with the second guide portion.

Passage portions 42 are formed at the edge portions of the third slide rail 26a and fourth slide rail 26b, wherein the passage portions 42 are cut out as much as the width of the protruded portion of the first slide rail 16a and the second slide rail 16b. When the first slide member 10 is slidably moved in the lengthwise direction, the passage portion 42 prevents the first slide rail 16a and the second slide rail 16b from being restrained from movement at the third slide rail 26a and a fourth slide rail 26b.

When the first slide member 10 is slidably moved in the lengthwise direction, both end portions where the passage portion 42 of the second slide member 20 is formed are restrained from movement at the inner side of the first slide rail 16a and the second slide rail 16b. Accordingly, when the first slide member 10 is moved in the lengthwise direction, the third slide rail 26a and the fourth slide rail 26b are restrained from movement in the first slide rail 16a and the second slide rail 16b, so that the second slide member 20 can be prevented from being moved in the widthwise direction.

A spring unit 44 is installed between the first slide member 10 and the guide member 30, to allow the first slide member 10 to be automatically slidably moved when the first slide member 10 is pushed in the lengthwise direction.

The spring unit 44 includes a first rod 46 rotatably connected with the first slide member 10, a second rod 48 connected to be movable in the lengthwise direction with the first rod 46, and a spring 50 installed between the first and second rods 46 and 48 and providing elastic force.

The spring unit 44 pushes first slide member 10 in the lengthwise direction, and when the first slide member 10 passes a dead point, the first slid member 10 is automatically slidably moved by virtue of elastic force of the spring 50.

In an alternative embodiment of the present invention, a spring unit similar to spring unit 44 can be installed between the second slide member 20 and the guide member 30 to provide elastic force when the second slide member 20 is moved in the widthwise direction, to slidably move the second slide member 20 automatically.

With reference to FIG. 6, a guide part 52 is installed between the first slide member 10 and the guide member 30 to prevent the first slide member 10 from being shaken and to guide the first slide member 10 so as to be linearly moved when the first slide member 10 is slidably moved in the lengthwise direction.

The guide part 52 includes a guide rail 54 formed in a lengthwise direction on a lower surface of the first slide member 10 and a guide roller 56 mounted to be rotatable on an upper surface of the guide member 30 and moving along the guide rail 54.

As for the guide part 52, when the first slide member 10 is moved in the lengthwise direction, the guide roller 56 is rotated to be moved along the guide rail 54, so that the first slide member 10 can be prevented from being shaken and to be linearly moved accurately.

With reference to FIG. 7, a locking unit 60 is formed between the first slide member 10 and the guide member 30 to lock the second slide member 20 so that it can be maintained in a current state, that is, in a closed state or opened state.

Figure 8:
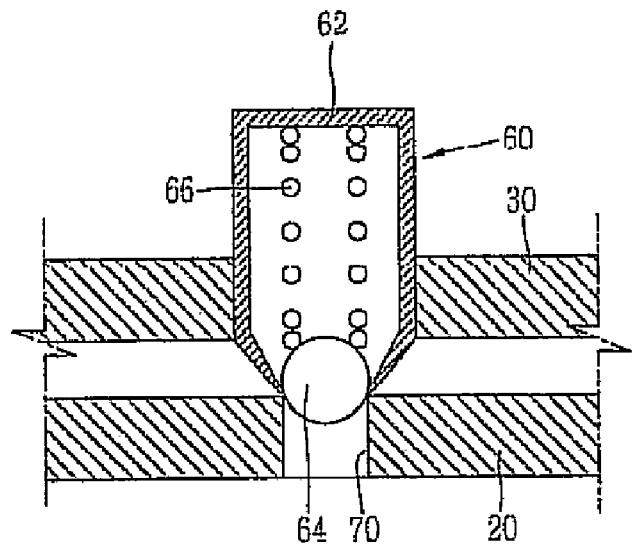
FIG. 8 is a sectional view of a locking unit in accordance with the present invention.

As shown in FIG. 8, the locking unit 60 includes a housing 62 mounted at the upper surface of the guide member 30, a locking ball 64 inserted to be movable in a vertical (up/down) direction in the housing 62, a spring 66 for providing elastic force to a locking ball 64, and locking holes 70 and 72 (see FIG. 5) formed at a certain interval in the widthwise direction at the second slide member 20, in which the locking ball 64 is inserted to be restrained from movement therein.

The locking holes 70 and 72 include a first locking hole 70 for elastically supporting a closed state of the second slide member 20 as the locking ball 64 is inserted therein when the second slide member 20 is closed, and a second locking hole 72 for elastically supporting an opened state of the second slide member 20 as the locking ball 64 is inserted therein when the second slide member 20 is slidably moved to be opened.

Figure 9:
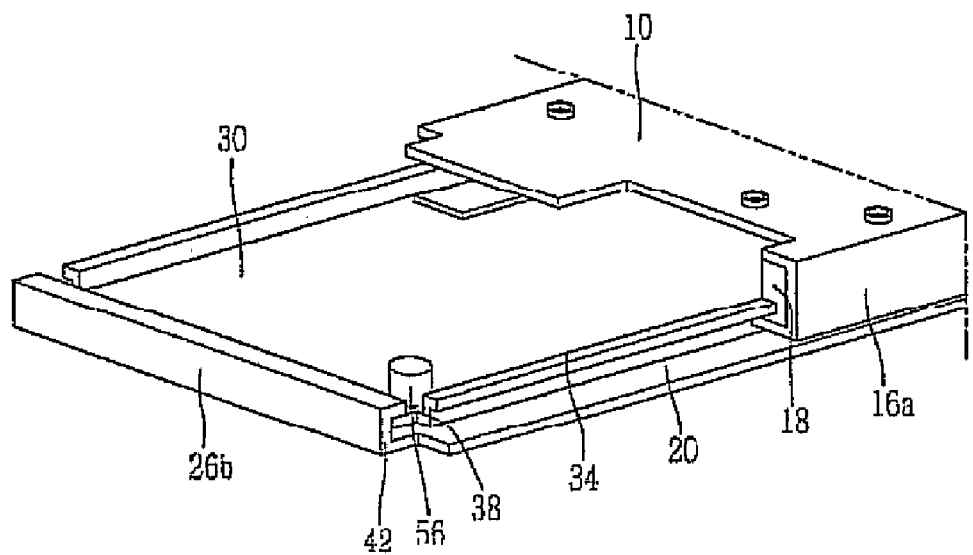
FIGS. 9 to 12 show operational states of the slide module in accordance with the present invention.
Figure 10:
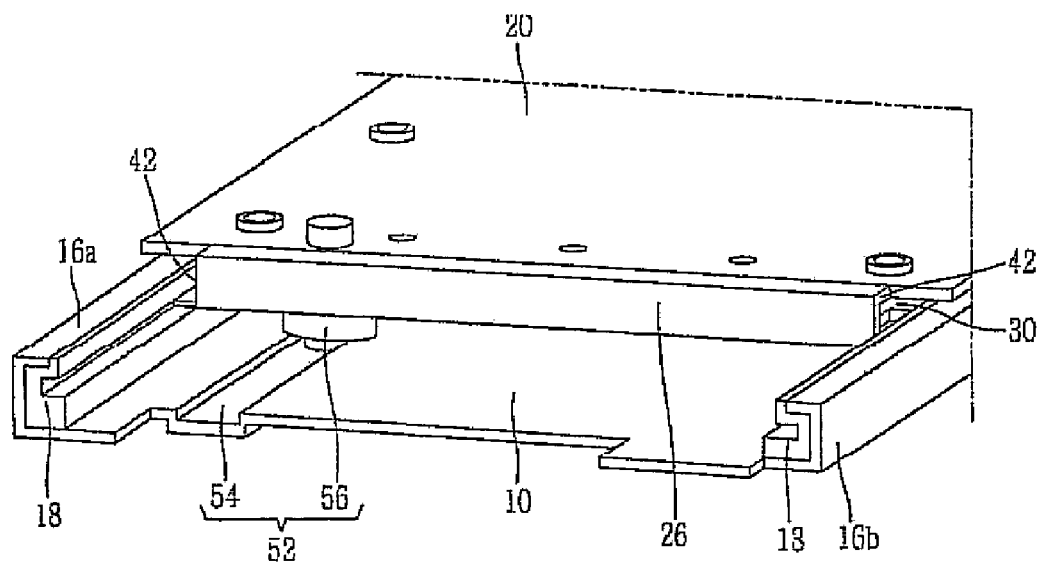

The operation of the slide module constructed as described above will be explained as follows. FIGS. 9 and 10 show operational states when the slide module is moved in the lengthwise direction in accordance with the present invention.

First, the slidable movement of the slide module in the lengthwise direction will be described. When the first slide member 10 is moved in the lengthwise direction, the first slide rail 16a and the second slide rail 16b of the first slide member 10 are slidably moved along the first guide portion 34 of the guide member 30.

At this time, since the first slide rail 16a and the second slide rail 16b pass through the passage portion 42 formed at the third slide rail 26a and the fourth slide rail 26b of the second slide member 20, the third slide rail 26a and the fourth slide rail 26b do not interfere the movement of the first slide rail 16a and the second slide rail 16b. And, since the both end portions of the third slide rail 26a and a fourth slide rail 26b are restrained from movement at the inner side of the first slide rail 16a and the second slide rail 16b, when the first slide member 10 is slidably moved in the lengthwise direction, the second slide member 20 is restrained in its movement in the widthwise direction.

Figure 11:
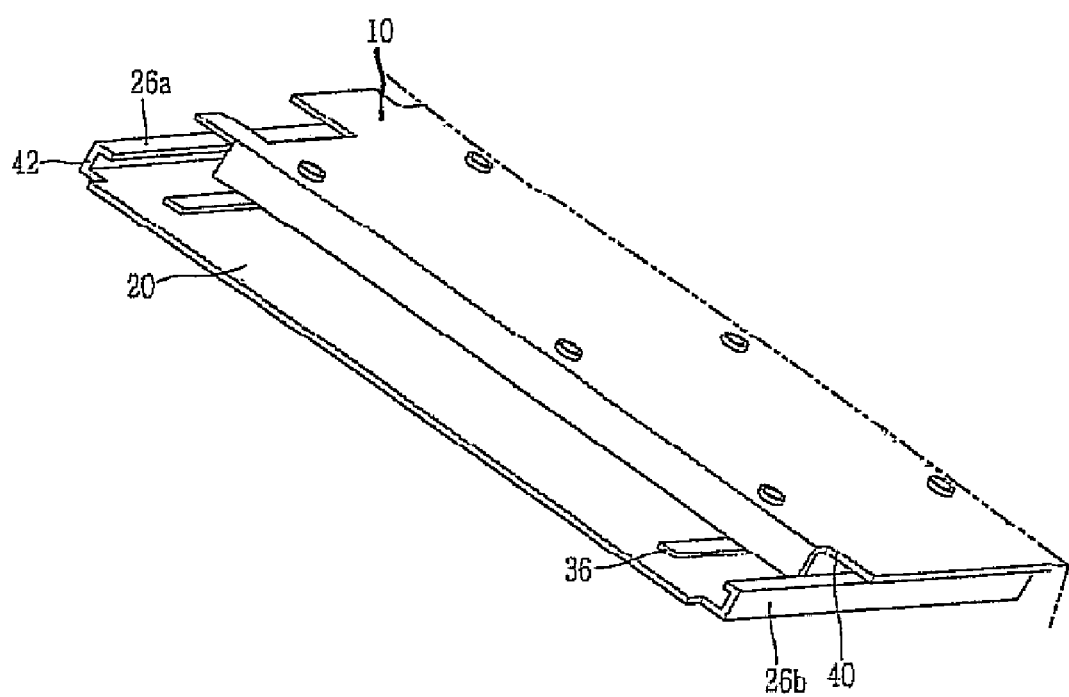
Figure 12:
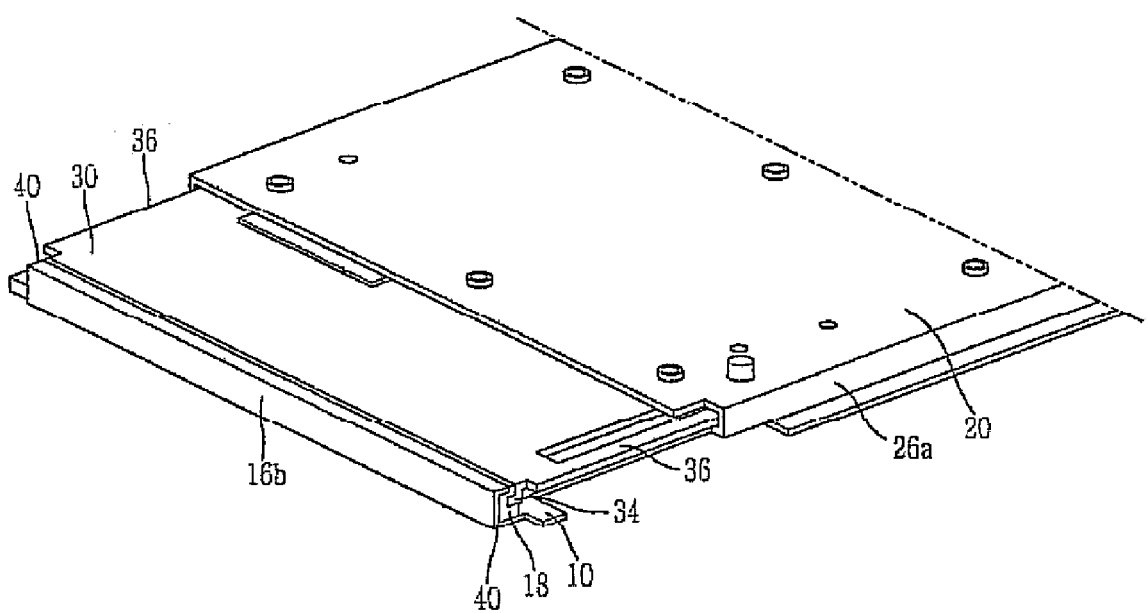

FIGS. 11 and 12 show operational states when the slide module is moved in the widthwise direction in accordance with the present invention.

The movement of the slide module in the widthwise direction will now be described. When the second slide member 20 is moved in the widthwise direction, the third slide rail 26a and the fourth slide rail 26b are slidably moved along the second guide portion 36 formed in the widthwise direction of the guide member 30.

At this time, the third slide rail 26a and the fourth slide rail 26b pass through the passage portion 40 formed at the first slide rail 16a and the second slide rail 16b and the passage portion 38 formed at the guide member 30.

And since the both end portions of the first slide rail 16a and the second slide rail 16b are restrained from movement at the inner side of the third slide rail 26a and a fourth slide rail 26b, when the second slide member 20 is slidably moved in the widthwise direction, the movement of the first slide member 10 in the lengthwise direction can be limited.

As so far described, the slide module in accordance with the present invention has the following advantages. That is, by including the guide member, the first slide member may be slidably moved in the lengthwise direction along the guide member, and the second slide member may be slidably moved in the widthwise direction along the guide member, thereby allowing the slide module to be moved in the widthwise direction as well as in the lengthwise direction, and thus, the mobile terminal can perform various functions.

In addition, when the first slide member is moved in the lengthwise direction, the second slide member is limited in its movement in the widthwise direction, while when the second slide member is moved in the widthwise direction, the first slide member is limited in its movement in the lengthwise direction, so the mobile terminal can be conveniently used.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A slide module, comprising:
   a first slide member having a first slide rail and a second slide rail, the first slide rail and the second slide rail configured for the first slide member to slide in a lengthwise direction;
   a second slide member having a third slide rail and a fourth slide rail, the third slide rail and the fourth slide rail configured for the second slide member to slide in a widthwise direction; and
   a guide member disposed between the first slide member and the second slide member,
   wherein the first slide rail and the second slide rail are configured to prevent the second slide member from moving in a widthwise direction when the first slide member is slid in a lengthwise direction, and the third slide rail and the fourth slide rail are configured to prevent the first slide member from moving in a lengthwise direction when the second slide member is slid in a widthwise direction.

2. The slide module of claim 1, wherein the guide member comprises:
   a body;
   a first guide portion formed on at least one lengthwise directional edge of the body; and
   a second guide portion formed on at least one widthwise directional edge of the body,
   wherein the first guide portion provides the guiding movement of the first slide member in the lengthwise direction and the second guide portion provides the guiding movement of the second slide member in the widthwise direction.

3. The slide module of claim 2, wherein the first guide portion is inserted into the first slide rail and the second slide rail and slidably moved in the lengthwise direction.

4. The slide module of claim 2, wherein the second guide portion is inserted into the third slide rail and the fourth slide rail and slidably moved in the widthwise direction.

5. The slide module of claim 3, wherein the first slide rail and the second slide rail are formed to protrude downwardly towards the guide member from the first slide member.

6. The slide module of claim 3, wherein the guide member further comprises a first passage portion formed at each of the four corners of the guide member, wherein the first slide rail and the second slide rail pass through the first passage portion when the first slide member is moved in the lengthwise direction.

7. The slide module of claim 3, wherein the first slide member further comprises a first slide rail inner side and a second slide rail inner side, wherein when the first slide member slidably moves in the lengthwise direction the second slide member is restrained from movement at the first and second slide rail inner sides.

8. The slide module of claim 3, wherein a buffer member is mounted at the first slide rail and the second slide rail to reduce friction with the first guide portion.

9. The slide module of claim 4, wherein the third slide rail and the fourth slide rail are formed to protrude upwardly towards the guide member from the second slide member.

10. The slide module of claim 3, wherein the first slide member further comprises a second passage portion formed on at least one end portion of the first slide member, wherein the second slide member passes through the second passage portion when the second slide member is moved in the widthwise direction.

11. The slide module of claim 4, wherein the second slide member further comprises a third slide rail inner side and a fourth slide rail inner side, wherein when the second slide member slidably moves in the widthwise direction the first slide member is restrained from movement at the third slide rail inner side and the fourth slide rail inner side.

12. The slide module of claim 1, further comprising a spring unit attachment between the first slide member and the guide member allowing the first slide member to be elastically biased when the first slide member is urged in the lengthwise direction.

13. The slide module of claim 1, further comprising a spring unit attachment between the second slide member and the guide member allowing the second slide member to be elastically biased when the second slide member is urged in the widthwise direction.

14. The slide module of claim 1, wherein a guide part disposed between the first slide member and the guide member slidably guides the sliding movement of the first slide member in the lengthwise direction.

15. The slide module of claim 14, wherein the guide part comprises a guide rail formed in the lengthwise direction on a lower surface of the first slide member, and a guide roller rotatably mounted on an upper surface of the guide member and moved along the guide rail.

16. The slide module of claim 1, further comprising a locking unit configured between the second slide member and the guide member to lock the second slide member in one of a closed state and an opened state.

17. The slide module of claim 16, wherein the locking unit comprises a housing mounted at the guide member, a locking ball inserted to be movable within the housing, a spring for providing elastic force to the locking ball, and at least one locking hole formed on the second slide member, wherein in the locking state the locking ball is inserted into the locking hole.

18. The slide module of claim 17, wherein the at least one locking hole comprises a first locking hole in which the locking ball is inserted when the second slide member is in the closed state, and a second locking hole in which the locking ball is inserted when the first slide member is in the opened state.

19. A mobile terminal, comprising:
a first body having a display;
a second body coupled with the first body; and
a slide module disposed between the first body and the second body, wherein the slide module comprises:
 a first slide member having a first slide rail and a second slide rail, the first slide rail and the second slide rail allow the first slide member to slide in a lengthwise direction,
 a second slide member having a third slide rail and a fourth slide rail, the third slide rail and the fourth slide rail configured for the second slide member to slide in a widthwise direction; and
 a guide member disposed between the first slide member and the second slide member,
 wherein the first slide rail and the second slide rail are configured to prevent the second slide member from moving in a widthwise direction when the first slide member is slid in a lengthwise direction, and the third slide rail and the fourth slide rail are configured to prevent the first slide member from moving in a lengthwise direction when the second slide member is slid in a widthwise direction.

20. The mobile terminal of claim 19, wherein the guide member comprises
a body;
a first guide portion formed on at least one lengthwise directional edge of the body; and
a second guide portion formed on at least one widthwise directional edge of the body,
wherein the first guide portion guides the sliding movement of the first slide member in the lengthwise direction, and the second guide portion guides the sliding movement of the second slide member in the widthwise direction.

21. The mobile terminal of claim 20, wherein the first guide portion is inserted into a first slide rail and a second slide rail and slidably moved in the lengthwise direction.

22. The mobile terminal of claim 20, wherein the second guide portion is inserted into a third slide rail and a fourth slide rail and slidably moved in the widthwise direction.

23. The mobile terminal of claim 21, wherein the first slide rail and the second slide rail are formed to protrude downwardly towards the guide member from the first slide member.

24. The mobile terminal of claim 21, wherein the guide member further comprises a first passage portion formed at each of the four corners of the guide member, wherein the first slide rail and the second slide rail pass through the first passage portion when the first slide member is moved in the lengthwise direction.

25. The mobile terminal of claim 21, wherein the first slide member further comprises a first slide rail inner side and a second slide rail inner side, wherein when the first slide member slidably moves in the lengthwise direction, the second slide member is restrained from movement at the first and second slide rail inner sides.

26. The mobile terminal of claim 21, wherein a buffer member is mounted at the first slide rail and the second slide rail to reduce friction with the first guide portion.

27. The mobile terminal of claim 22, wherein the third slide rail and the fourth slide rail are formed to protrude upwardly towards the guide member from the second slide member.

28. The mobile terminal of claim 19, wherein the first slide member further comprises a second passage portion formed on at least one end portion of the first slide member, wherein the second slide member passes through the second passage portion when the second slide member is moved in the widthwise direction.

29. The mobile terminal of claim 22, wherein the second slide member further comprises a third slide rail inner side and a fourth slide rail inner side, wherein when the second slide member slidably moves in the widthwise direction, the first slide member is restrained from movement at the third slide rail inner side and the fourth slide rail inner side.

30. The mobile terminal of claim 19, further comprising a spring unit attachment between the first slide member and the guide member allowing the first slide member to be elastically biased when the first slide member is urged in the lengthwise direction.

31. The mobile terminal of claim 19, further comprising a spring unit attachment between the second slide member and the guide member allowing the second slide member to be elastically biased when the second slide member is urged in the widthwise direction.

32. The mobile terminal of claim 19, wherein a guide part disposed between the first slide member and the guide member slidably guides the sliding movement of the first slide member in the lengthwise direction.

33. The mobile terminal of claim 32, wherein the guide part comprises a guide rail formed in the lengthwise direction on a lower surface of the first slide member, and a guide roller rotatably mounted on an upper surface of the guide member and moved along the guide rail.

34. The mobile terminal of claim 19, further comprising a locking unit configured between the second slide member and the guide member to lock the second slide member in one of a closed state and an opened state.

35. The mobile terminal of claim 34, wherein the locking unit comprises a housing mounted at the guide member, a locking ball inserted to be movable within the housing, a spring for providing elastic force to the locking ball, and at least one locking hole formed on the second slide member, wherein in the locking state the locking ball is inserted into the at least one locking hole.

36. The mobile terminal of claim 35, wherein the at least one locking hole comprises a first locking hole in which the locking ball is inserted when the second slide member is in the closed state, and a second locking hole in which the locking ball is inserted when the first slide member is in the opened state.

* * * * *